US008066483B1

(12) United States Patent
Liang

(10) Patent No.: US 8,066,483 B1
(45) Date of Patent: Nov. 29, 2011

(54) TURBINE AIRFOIL WITH NON-PARALLEL PIN FINS

(75) Inventor: George Liang, Palm City, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 551 days.

(21) Appl. No.: 12/337,696

(22) Filed: Dec. 18, 2008

(51) Int. Cl.

| | |
|---|---|
| ***B63H 1/14*** | (2006.01) |
| ***B63H 7/02*** | (2006.01) |
| ***B63H 1/26*** | (2006.01) |
| ***B64C 11/00*** | (2006.01) |
| ***B64C 27/46*** | (2006.01) |
| ***F01D 5/08*** | (2006.01) |
| ***F01D 5/18*** | (2006.01) |
| ***F01D 5/20*** | (2006.01) |
| ***F03D 11/02*** | (2006.01) |
| ***F04D 29/58*** | (2006.01) |
| ***F03B 3/12*** | (2006.01) |

(52) U.S. Cl. ................ 416/96 R; 416/97 R; 416/241 B; 416/241 R

(58) Field of Classification Search ................ 416/96 R, 416/97 R, 241 B, 241 R See application file for complete search history.

(56) References Cited

U.S. PATENT DOCUMENTS

| | | | | |
|---|---|---|---|---|
| 4,515,523 | A * | 5/1985 | North et al. | 415/115 |
| 5,779,447 | A * | 7/1998 | Tomita et al. | 416/97 R |
| 6,152,695 | A * | 11/2000 | Fukue et al. | 416/97 R |
| 6,572,335 | B2 * | 6/2003 | Kuwabara et al. | 416/97 R |
| 6,742,991 | B2 * | 6/2004 | Soechting et al. | 416/97 R |
| 6,761,529 | B2 * | 7/2004 | Soechting et al. | 415/115 |

* cited by examiner

*Primary Examiner* — David Zarneke
(74) *Attorney, Agent, or Firm* — John Ryznic

(57) ABSTRACT

A turbine blade for use in a gas turbine engine having an internal serpentine flow cooling circuit with pin fins and trip strips to promote heat transfer for obtaining a thermally balanced blade sectional temperature distribution. The serpentine flow cooling circuit forms a 7-pass serpentine flow circuit from the leading edge, along the pressure side, through the trailing edge region, and then along the suction side. The serpentine flow circuit of the present invention is formed by a printing process without the need for a ceramic core and casting, and where the pin fins for all of the channels can be aligned perpendicular to the airfoil surface. The metallic and ceramic printing process can be used to form a single piece airfoil with all of the internal cooling passages and features as a single piece.

17 Claims, 2 Drawing Sheets

TURBINE AIRFOIL WITH NON-PARALLEL PIN FINS

CROSS-REFERENCE TO RELATED APPLICATIONS

This application is related to U.S. patent application Ser. No. 11/527,307 filed by Liang on Sep. 9, 2006 and entitled CERAMIC CORE ASSEMBLY FOR SERPENTINE FLOW CIRCUIT IN A TURBINE BLADE.

FEDERAL RESEARCH STATEMENT

None.

BACKGROUND OF THE INVENTION

1. Field of the Invention

The present invention relates generally to a gas turbine engine, and more specifically to an air cooled turbine airfoil having non-parallel pin fins.

2. Description of the Related Art Including Information Disclosed Under 37 CFR 1.97 and 1.98

A gas turbine engine has a turbine section with a multiple stages of stationary vanes or nozzles and rotary blades or buckets exposed to extremely high temperature flow. The first stage vanes and blades are exposed to the highest temperature since the gas flow temperature progressively decreases through the turbine due to the extraction of energy. Especially in an industrial gas turbine engine, efficiency is the prime objective. In order to increase the efficiency of the engine, a higher gas flow temperature can be used in the turbine. However, the highest temperature that can be used depends upon the properties of the materials used in the turbine parts. For this reason, providing internal air cooling of the blades and vanes allows for a temperature higher than the material properties can withstand alone.

Another method of increasing the efficiency of the engine, for efficient use of the cooling air passing through the cooled airfoils is desired. Since the cooling air is generally bleed air from the compressor, maximizing the cooling effect while minimizing the amount of cooling air bled off from the compressor will increase the engine efficiency as well. Blade designers have proposed complex air cooling passages to maximize cooling efficiency while minimizing cooling volume. On a typical first stage turbine blade, the hottest surfaces occur at the airfoil leading edge, on the suction side immediately downstream from the leading edge, and on the pressure side of the airfoil at the trailing edge region. A showerhead arrangement is generally used to provide cooling for the leading edge of the airfoil. One problem blade designers are challenged with is that the hottest section on the suction side is also at a lower pressure than on the pressure side. A serpentine flow cooling circuit of the prior art that provides cooling for both the pressure side and the suction side will provide adequate cooling for the airfoil, but uses more cooling air that needed. Film cooling holes opening onto the pressure side and the suction side that are supplied with cooling air from the same cooling channel will both be discharging cooling air at the same pressure. Since the hot gas flow pressure on the suction side is lower than the pressure side, more cooling air will be discharged onto the suction side than is needed.

In a turbine airfoil with a serpentine flow cooling circuit, the cross sectional area of the passages must be sized in order than the airfoil walls will not be too thick. In many situations such as in open serpentine flow channels, some of the passages have cross sectional areas that are too large and result in low levels of heat transfer from the hot metal surface of the passage to the cooling air because the cooling air velocity is too low.

Turbine airfoils (which include blades and vanes) are typically cast as a single piece with the cooling passages cast within the airfoil. Ceramic cores having the cooling passage shape is used to form the airfoil. One problem with the prior art investment casting process that is used to produce a turbine airfoil is that the cooling passages within the airfoil have pin fins that are formed parallel to each other within the common passage or passages formed from a single ceramic core. Because of the die pulling direction in the die that is used to cast the ceramic core, the pin fins are limited to being in the pulling direction of the mold and thus are all parallel to each other. In some cast turbine airfoils, more than one ceramic core is sued. In this type, pin fins produced by one core are not required to be parallel to pin fins produced form a second core.

In a ceramic core used to form the inner cooling circuit of a turbine airfoil, the ceramic core includes pin fins forming projection that are arranged in parallel to each other and in a pulling direction of the mold used to cast the ceramic core. In the turbine airfoil of the present invention that has a 7-pass serpentine flow circuit; two ceramic cores are required to form the serpentine circuit. Each of the pin fin forming projections on a ceramic core must be formed parallel because of the pulling direction of the mold. For a two-core assembly, two different directions of pin fins can be formed because two molds are used to form the two cores.

In an investment casting process, there are minimum wall thicknesses that can be cast because of the viscosity of the molten metal and its capacity to flow through the mold and around the ceramic cores or through small holes or spaced. Also, with investment casting only a single metal or alloy can be poured into the mold. Thus, producing a single metallic piece of composite metal materials is not possible with this process.

Another problem with the prior art turbine blades produced using the investment casting process is that the blade root is cast without the fir tree configuration for mounting within the slots of the rotor disk. in this process, the blade is cast first and then the fir tree configuration is machined into the root portion. This adds further expense and complexity to the production of a turbine rotor blade.

BRIEF SUMMARY OF THE INVENTION

It is an object of the present invention to provide a turbine airfoil with an internal cooling air circuit that would provide for a thermally balanced airfoil sectional temperature distribution.

It is another object of the present invention to provide for a turbine airfoil which allows for a maximize usage of the hot gas side pressure distribution in order to lower the required cooling air supply pressure to reduce the overall airfoil leakage flow.

It is another object of the present invention to provide for a turbine airfoil with a multiple pass serpentine flow cooling circuit that can be formed without the need of a ceramic core.

It is another object of the present invention to provide for a turbine airfoil having a multiple pass serpentine flow cooling circuit in which the pin fins in a common channel or leg are not required to be parallel to each other.

It is another object of the present invention to provide for a turbine rotor blade in which the blade is formed with a fir tree root configurations during the process of forming the airfoil such that the fir tree configuration is not required to be formed after the airfoil is formed.

It is another object of the present invention to provide for a turbine airfoil which can be made from two or more different metallic materials to form a composite airfoil.

It is another object of the present invention to provide for a turbine airfoil with a thin wall surface to produce better near wall cooling.

The present invention is a turbine airfoil having a 7-pass serpentine flowing cooling circuit with two legs on the pressure side of the airfoil, a common leg along the trailing edge region and four legs or channels on the suction side of the airfoil to provide high levels of cooling while using low amounts of cooling air, and in which the turbine airfoil is produced using a process of "printing" the airfoil from a process that can build up the airfoil on a molecular level in layers using the process developed by Mikro Systems, Inc. of Charlottesville, Va. which can also be used to produce very fine details within the metallic structure that cannot be cast using the present day investment casting process. The Mikro Systems process can be used to "print" an entire airfoil (stator vane or rotor blade) as a single piece without the need to cast the airfoil, or can be used to "print" the ceramic core that is used in the investment casting process to produce the airfoil. In the present invention, the entire rotor blade with the 7-pass serpentine flow circuit and the fir tree root section can be produced using the Mikrosystems process as a single piece and in which the pin fins for each pass of the serpentine flow circuit can be formed in a non-parallel arrangement.

Because of the process of "printing" an airfoil, the airfoil can be formed from different metallic materials and formed with thin walls to produce improved near-wall cooling of the airfoil wall. In a rotor blade, the central chordwise rib can be formed from one material, the outward extending ribs can be formed from a second material, and the airfoil walls can be formed from a third material in order to produce a airfoil metal temperature more consistent and with less thermal stress induced. This composite metallic airfoil cannot be produced using investment casting. Thin airfoil walls of less than 0.020 inches can be formed with this printing process which cannot be formed using the investment casting process.

DETAILED DESCRIPTION OF THE INVENTION

Figure 1:
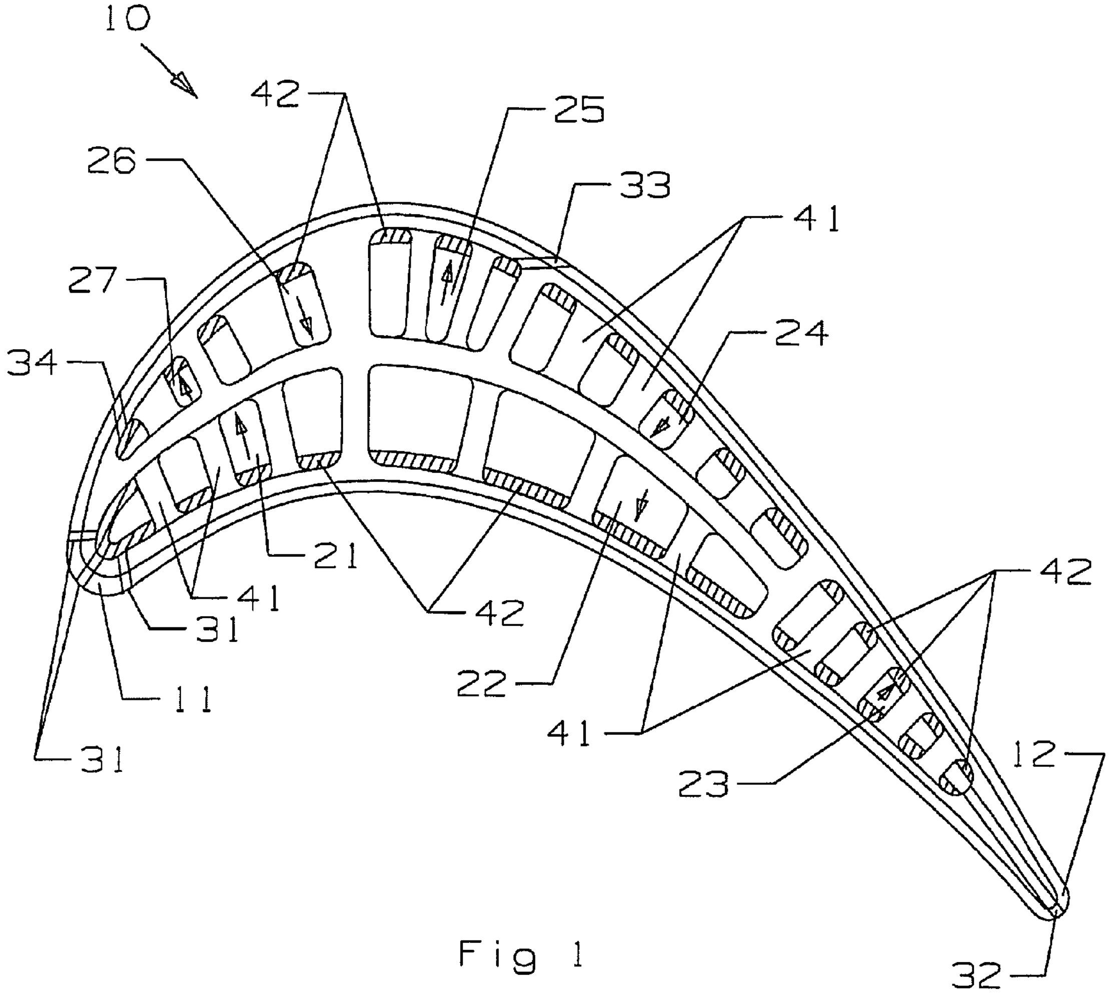
FIG. 1 shows a cross sectional view of the near wall serpentine flow cooling circuit of the present invention.
Figure 2:
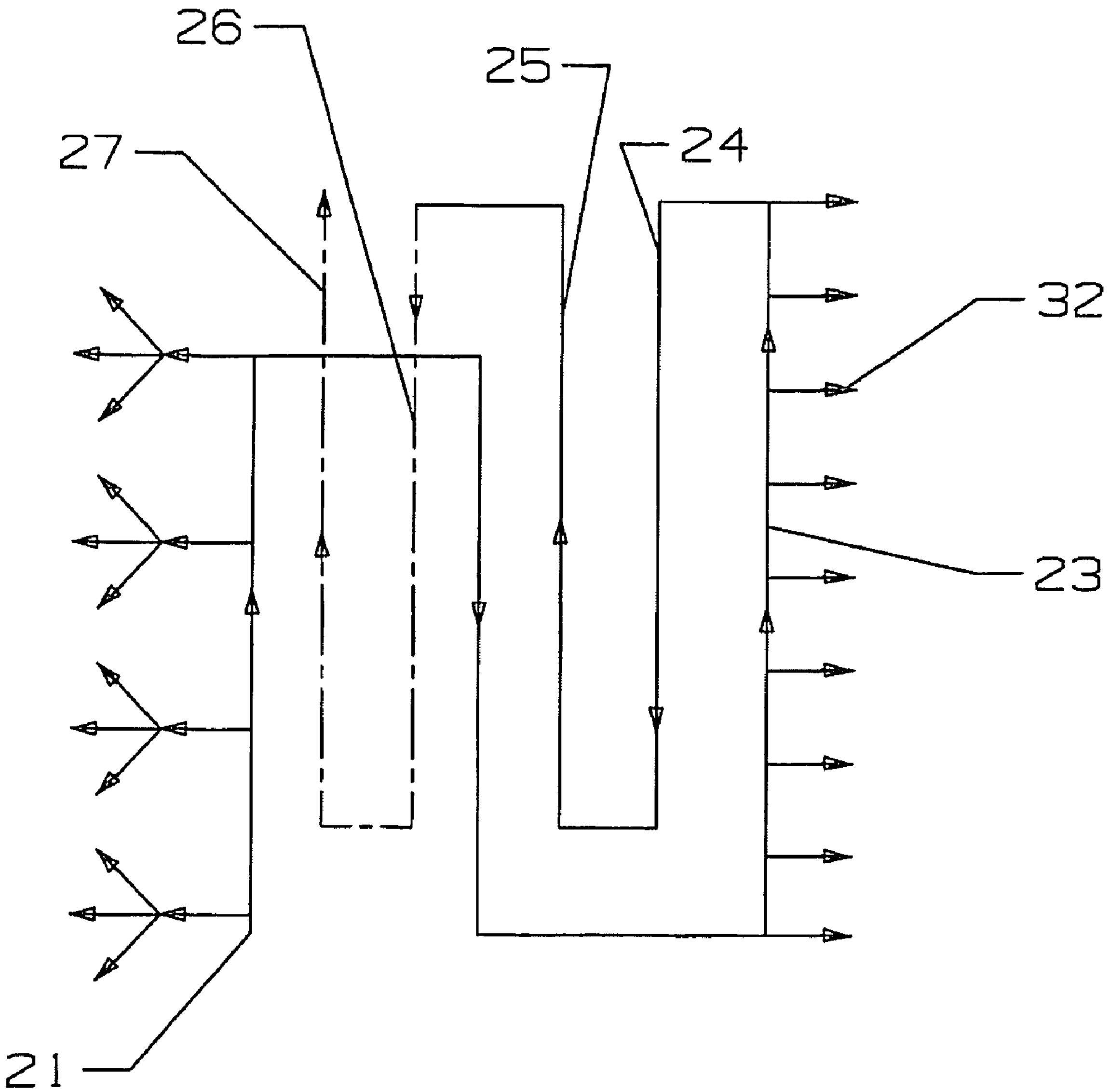
FIG. 2 a diagram of the flow direction of the 76-pass serpentine flow cooling circuit of the blade of FIG. 1.

The present invention is a turbine blade having a seven pass serpentine flow cooling circuit with pins fins and trip strips positioned within the serpentine channels to promote heat transfer from blade walls to inner walls and to the cooling air passing through the channels. FIG. 1 shows the serpentine circuit of the present invention for a blade 10. The present invention could also be adapted for use in a turbine vane, both of which are considered to include turbine airfoils. An airfoil is the portion of the blade or vane that reacts with the hot gas flow and has an airfoil cross sectional shape with a leading and trailing edge and a pressure side and suction side wall.

The blade 10 includes a leading edge 11 and a trailing edge 12, and a pressure side (PS) and a suction side (SS) forming the airfoil shape. A first leg 21 of the serpentine circuit is located in the leading edge region of the blade. The first channel or leg 21 includes pin fins 41 extending from an inner partition wall to an outer wall of the blade. In the present embodiment, the first channel 21 includes 3 pin fins in the blade chordwise direction. Trip strips 42 are also located within the channel 21 on the outer side adjacent to the blade exterior surface. Film cooling holes 31 forming a showerhead cooling circuit are located along the leading edge and connected to the first channel 21 to discharge a portion of the cooing air within the first channel 21 to the leading edge surface of the blade for cooling thereof. Because of the process of forming the blade does not require a ceramic core, the pin fins 41 in the first leg (or any leg) do not need to be parallel to each other. Thus, the pin fins 41 in the first leg are not all parallel to each other.

Downstream from the first leg or channel 21 of the serpentine flow cooling circuit is the second leg or channel 22, and includes three pin fins 41 (in a chordwise plain of the airfoil) extending across the second channel 22 from the inner partition wall to the outer wall of the blade 10. Trip strips 42 are also located on the outer wall of the second channel 22 to promote heat transfer from the wall to the cooling air. A third channel 23 of the serpentine circuit is located along the trailing edge region of the blade, and includes pin fins 41 and trip strips 42 to enhance internal heat transfer performance and conducting heat from the airfoil wall to the inner partition wall. Cooling air exit holes 32 are spaced along the trailing edge of the blade 10 and discharge a portion of the cooling air flowing through the third channel 23. the pin fins 41 in any of the legs or channels are not required to be parallel to each other in a common passage.

Cooling air flowing through the third channel 23 in the trailing edge region then flows into the fourth leg 24, and then into the fifth leg 25, the sixth leg 26, and then the seventh leg 27 of the seven pass serpentine flow cooling circuit. Each of the legs or channels includes pin fins extending across the channel and trip strips along the hot wall section of the channels. The fifth leg channel 25 and the seventh leg channel 27 both include film cooling holes 33 and 34 to discharge cooling air to the blade surface. The locations of the film cooling holes are placed where the hottest external surface temperatures on the blade are found. Other embodiment of the present invention could include more film cooling holes in other channels if the external heat load requires the extra cooling.

The pin fins 41 extending across the channels provide conductive heat transfer from the outer blade wall to the inner wall partition to help in providing for a thermally balanced blade sectional temperature distribution. The pin fins 41 also reduce the flow area through the channels. Because of the film cooling holes located along the serpentine flow path, the volume of cooling air passing through the path will be reduced and therefore the flow velocity would normally fall if the channels were completely open. The pin fins therefore are sized and numbered within the channels to reduce the flow area and maintain a proper flow velocity through the serpentine path. The trip strips 42 located along the serpentine channels on the hot side of the channel act to promote turbulent flow within the cooling air to also enhance the heat transfer to the cooling air.

The turbine rotor blade 10 with the pin fins 41 can be "printed" using the Mikrosystems process so that the pin fins in any one of the seven passes in the 7-pass serpentine circuit can be formed in a non-parallel arrangement, e.g., the pin fins 41 in the first pass channel 21 are not parallel to one another or some of them are not parallel to others within the channel. Because the entire blade 10 can be printed using this process, no ceramic core is required and no casting process is required.

Because no ceramic core is required, and because the entire airfoil can be printed as a single piece, the pin fins do not need to be parallel but can be formed perpendicular to the airfoil wall. By forming the pin fins 41 to be perpendicular to the airfoil wall, the pin fins are formed as short as possible and provide the highest level of heat transfer from the metal to the cooling air passing over them.

Since the Mikro Systems process can be used to "print" an entire airfoil from a metallic material such as a nickel superalloy or even tungsten or Molybdenum, the turbine airfoil can be formed with all of the cooling air passages and pin fins and trip strips all in one process and as a single piece. The turbine rotor blade can be printed using the same material throughout or printed using multiple materials. For example, the portion of the blade that does not include the airfoil walls can be printed using one material while the airfoil wall can be printed using a different material that has a higher heat resistance. Also, because the Mikro Systems process can be used to print out both metallic and ceramic materials, a TBC can be applied to the outer airfoil surface to form a single piece composite turbine rotor blade with the 7-pass serpentine flow cooling circuit and the TBC as a single piece.

Also, the turbine rotor blade of FIG. 1 can be printed so that the chordwise extending rib in the center can be formed from a first material, the ribs and pin fins can be formed from a second and different material, and the airfoil walls can be formed from a third and different material in order to use materials that will produce a airfoil metal temperature with lower temperature differences to reduce the thermal stress loads formed. The central extending chord is the cooling part of the airfoil while the airfoil walls are the hottest temperature part. The ribs and pin fins are in-between the cold part and the hot part, and thus produce high thermal stress loads. These parts can be formed form different materials in order to decrease the temperature difference.

The printing process is also used to produce a thin airfoil wall that will produce near-wall cooling far better than the airfoil walls formed from the investment casting process. An airfoil wall of 0.020 inches is possible with the Mikro Systems printing process. With this thin airfoil wall, the near-wall cooling of the wall will produce a metal temperature of the airfoil wall about equal to the temperature of the impingement cooling air used. With this low of an airfoil metal temperature, the airfoil wall will have long life compared to the prior art airfoils.

The cooling flow operation of the present invention is described below. Fresh cooling air is supplied through the airfoil leading edge cavity in the first leg or channel 21 of the serpentine flow circuit and provides cooling for the leading edge region where the external heat load is the highest. In addition, the pin fins 41 and trip strips 42 incorporated within the cooling supply cavity 21 enhance the internal heat transfer performance and conducts heat from the airfoil wall to the inner partition wall. The pin fins 41 and the trip strips 42 are formed along with the airfoil during the printing process. Cooling air is then serpentine rearward through the forward section of the airfoil pressure side surface through channel 22. A parallel flow cooling flow technique is used for the airfoil pressure surface, where the cooling air will flow inline with the airfoil external pressure and heat load. This design will maximize the use of cooling air pressure to maintain gas side pressure potential as well as tailoring the airfoil external heat load. A cooling scheme of this sort is particularly applicable to the airfoil pressure side just aft of the leading edge where the airfoil heat load is low. This eliminates the use of film cooling and generates a low heat sink at the forward portion of the pressure sidewall which balances the high heat load on the airfoil suction sidewall, especially with a hotter cooling air in the serpentine cooling cavities. The spent cooling air is then discharged into the blade root section open cavity where the cooling air is then transported into the trailing edge up pass flow channel 23.

The cooling air is channeled through the trailing edge pin bank radial channel 23 to provide cooling for the airfoil trailing edge section and portion of the cooling air exit out the airfoil trailing edge through multiple small holes 32 for the cooling of the airfoil trailing edge corner. This cooling flow channel 23 also serves as the first up-pass channel of the airfoil suction side forward flow serpentine circuit. The pin bank flow channels balanced the thermal distribution for both of the trailing edge pressure and suction side walls.

The rotor blade can be produced using the Mikro Systems printing process without the film cooling holes or the exit cooling holes, and then these holes can be drilled or formed into the airfoil using a process such as EDM or laser drilling of the holes. However, these holes can be formed during the printing process of the airfoil in order to reduce the manufacturing steps required to produce the rotor blade.

A counter flow cooling technique is utilized for the airfoil suction surface to maximize the use of cooling air. Cooler cooling air is supplied at down stream of the airfoil suction surface where the airfoil heat load is high. The cooling air flows toward the airfoil leading edge, picking up heat along the pin fins channel and then discharging into the airfoil external surface to provide a layer of precisely placed film cooling sub-layer at the location where the heat load is high and the main stream static pressure is still low. This counter flow cooling mechanism maximizes the use of cooling air and provides a very high overall cooling efficiency for the airfoil suction side surface. The pin fins used in the suction side serpentine flow channel conducting heat from the airfoil wall into the inner partition wall. Both the pressure side and the suction side pin fins are connected to the inner partition wall. This conducts heat to each other while the cooler cooling air cavity on the pressure side corresponds to the warmer air cavity on the suction side and therefore balancing the wall temperature for the airfoil pressure and suction side walls and achieving a thermally balanced blade cooling design.

In addition to the thermally balanced cooling design, the cooling circuit of the present invention is designed to also maximize the use of the hot gas side pressure distribution. The cooling flow initiates at the airfoil leading edge and ends at the airfoil suction side just downstream from the leading edge, which lowers the required cooling supply pressure and therefore reduces the overall blade leakage flow.

The near wall serpentine flow cooling circuit of the present invention is shown as a seven pass serpentine circuit with two passes on the pressure side and four passes on the suction side with a common trailing edge pass. However, other serpentine flow designs could be used such as a five pass serpentine circuit with two passes on the pressure side and two passes on the suction side with a common trailing edge pass in-between. Or, a six pass serpentine flow circuit could be used with two passes on the pressure side and three passes on the suction side with a common trailing edge pass in-between.

The cross sectional size of the pin fins can be varied throughout the serpentine flow circuit in order to vary the conductive heat transfer from wall to wall and to vary the flow area through the channels in order to regulate the heat transfer to the cooling air.

I claim the following:

1. An air cooled turbine airfoil comprising:

a leading edge and a trailing edge;

a pressure side wall and a suction side wall extending between the leading and trailing edges;

a multiple pass serpentine flow cooling circuit extending along the pressure side wall;

a plurality of pin fins extending across one of the channels of the serpentine flow cooling circuit; and, some of the pin fins in the channel are not parallel to other pin fins in the same channel.

2. The air cooled turbine airfoil of claim 1, and further comprising:

the pin fins in the one channel are perpendicular to the airfoil wall.

3. The air cooled turbine airfoil of claim 1, and further comprising:

the multiple pass serpentine flow circuit extends from the leading edge region to the trailing edge region on the pressure side wall of the airfoil;

pin fins extend across the channels that extend along the pressure side wall; and, the pin fins in the channels that extend across the pressure side wall are perpendicular to the pressure side wall.

4. The air cooled turbine airfoil of claim 1, and further comprising:

the multiple pass serpentine flow cooling circuit is a 7-pass serpentine circuit with the first two channels on the pressure side and the last four channels on the suction side;

the first two channels and the last four channels include pin fins extending across the channels; and, the pin fins in adjacent channels are not all parallel to each other.

5. The air cooled turbine airfoil of claim 4, and further comprising:

the pin fins in the first two channels are perpendicular to the pressure side wall; and, the pin fins in the last four channels are perpendicular to the suction side wall.

6. The air cooled turbine airfoil of claim 4, and further comprising:

the first two channels and the last four channels include multiple pin fins in a chordwise plain of the airfoil.

7. The air cooled turbine airfoil of claim 1, and further comprising:

the airfoil and the pin fins are formed as a single piece.

8. The air cooled turbine airfoil of claim 7, and further comprising:

the airfoil and the pin fins are printed using a high temperature resistant material used in a turbine section of a gas turbine engine.

9. The air cooled turbine airfoil of claim 8, and further comprising:

a TBC is printed onto the airfoil surface.

10. The air cooled turbine airfoil of claim 9, and further comprising:

the TBC is printed onto the metallic airfoil with a transition from zero % ceramic to 100% ceramic.

11. The air cooled turbine airfoil of claim 1, and further comprising:

the internal rib and the pin fins and the airfoil walls are formed from different materials.

12. The air cooled turbine airfoil of claim 11, and further comprising:

the different materials are chosen to minimize the metal temperature difference of the airfoil.

13. The air cooled turbine airfoil of claim 1, and further comprising:

the airfoil is an IGT airfoil with a wall has a thickness of less than 0.030 inches.

14. An air cooled turbine airfoil comprising:

an internal chordwise extending rib;

an airfoil thin wall surface;

a plurality of pin fins extending between the chordwise extending rib and the airfoil thin wall surface;

the airfoil being formed as a single piece; and, the chordwise extending rib and the pin fins and the airfoil thin wall all three being made from a different material.

15. The air cooled turbine airfoil of claim 14, and further comprising:

the airfoil thin wall has a thickness of less than 0.030 inches.

16. The air cooled turbine airfoil of claim 14, and further comprising:

the airfoil thin wall has a thickness of less than 0.020 inches.

17. The air cooled turbine airfoil of claim 14, and further comprising:

a ceramic TBC formed as part of the single piece airfoil.

* * * * *